United States Patent
Sisk et al.

(10) Patent No.: US 10,591,081 B2
(45) Date of Patent: Mar. 17, 2020

(54) SOLENOID COIL INCLUDING BOBBIN WITH MOISTURE BARRIER

(71) Applicant: Emerson Electric Co., St. Louis, MO (US)

(72) Inventors: Gregory E. Sisk, Bonne Terre, MO (US); Thomas Farace, Marine, IL (US)

(73) Assignee: Emerson Electric Co., St. Louis, MO (US)

( * ) Notice: Subject to any disclaimer, the term of this patent is extended or adjusted under 35 U.S.C. 154(b) by 876 days.

(21) Appl. No.: 15/088,939

(22) Filed: Apr. 1, 2016

(65) Prior Publication Data

US 2017/0284555 A1 Oct. 5, 2017

(51) Int. Cl.
*F16K 31/06* (2006.01)
*H01F 5/02* (2006.01)
*H01F 5/06* (2006.01)

(52) U.S. Cl.
CPC .......... *F16K 31/0675* (2013.01); *H01F 5/02* (2013.01); *H01F 5/06* (2013.01)

(58) Field of Classification Search
CPC ................................................ F16K 31/0675
See application file for complete search history.

(56) References Cited

U.S. PATENT DOCUMENTS

| | | | | |
|---|---|---|---|---|
| 3,604,457 A | * | 9/1971 | Douglas | F16K 31/0658 137/596.16 |
| 5,278,496 A | * | 1/1994 | Dickmeyer | G01P 3/488 174/353 |
| 5,558,311 A | * | 9/1996 | Connolly | B60R 16/0207 251/129.15 |
| 6,854,703 B2 | * | 2/2005 | Parker | F02M 57/025 251/30.01 |
| 7,187,262 B1 | | 3/2007 | Henry et al. | |
| 7,532,100 B2 | | 5/2009 | Henry et al. | |
| 8,134,439 B2 | * | 3/2012 | Scherer | H01F 7/128 335/251 |
| 2005/0051143 A1 | * | 3/2005 | Weldon | F02M 25/0836 123/520 |
| 2005/0098400 A1 | * | 5/2005 | Kleinert | F16H 63/3433 188/300 |
| 2006/0185654 A1 | * | 8/2006 | Modien | F16K 31/0675 123/568.21 |

(Continued)

*Primary Examiner* — Elvin G Enad
*Assistant Examiner* — Malcolm Barnes
(74) *Attorney, Agent, or Firm* — Armstrong Teasdale LLP

(57) ABSTRACT

A solenoid coil includes a coil winding that generates an electromagnetic force when a current is supplied to the coil winding. The solenoid coil also includes an electrically insulative bobbin made of an insulating material having a melting point. The bobbin includes a spool for supporting the coil winding. The spool includes a first end and a second end opposite the first end. The coil winding is positioned between the first end and the second end. The bobbin also includes a flange connected to one of the first end and the second end. A continuous ridge extends from the flange between an outer edge and studs to form a moisture barrier. The solenoid coil further includes an overmold enclosing at least a portion of the bobbin and the coil winding. The overmold bonds to the continuous ridge when the solenoid coil is heated to a temperature above the melting point.

20 Claims, 7 Drawing Sheets

(56) References Cited

U.S. PATENT DOCUMENTS

| | | | | |
|---|---|---|---|---|
| 2007/0035373 A1* | 2/2007 | Henry | ............... | B29C 45/14311 |
| | | | | 336/198 |
| 2008/0036564 A1* | 2/2008 | Henry | ............... | B29C 45/14311 |
| | | | | 336/198 |
| 2008/0116406 A1* | 5/2008 | Robertson, III | .......... | F16K 7/14 |
| | | | | 251/129.08 |
| 2010/0266849 A1* | 10/2010 | Krenz | ................. | B29C 45/1657 |
| | | | | 428/409 |
| 2012/0248358 A1* | 10/2012 | Pic | ...................... | F16K 31/0675 |
| | | | | 251/129.15 |
| 2012/0323379 A1* | 12/2012 | Robertson, III | .... | F16K 31/0655 |
| | | | | 700/282 |
| 2014/0232498 A1* | 8/2014 | Fonville | ................... | H01F 5/02 |
| | | | | 335/255 |
| 2017/0254306 A1* | 9/2017 | Lucas | ................. | F02M 59/466 |
| 2017/0282191 A1* | 10/2017 | Lee | ......................... | B03C 1/30 |
| 2018/0006397 A1* | 1/2018 | Lee | ........................ | F16K 31/06 |
| 2019/0017480 A1* | 1/2019 | Schulz | ............... | F02M 63/0071 |
| 2019/0078700 A1* | 3/2019 | Kanai | ................... | F16K 31/06 |
| 2019/0078701 A1* | 3/2019 | Bergfeld | ................... | F16K 1/36 |

* cited by examiner

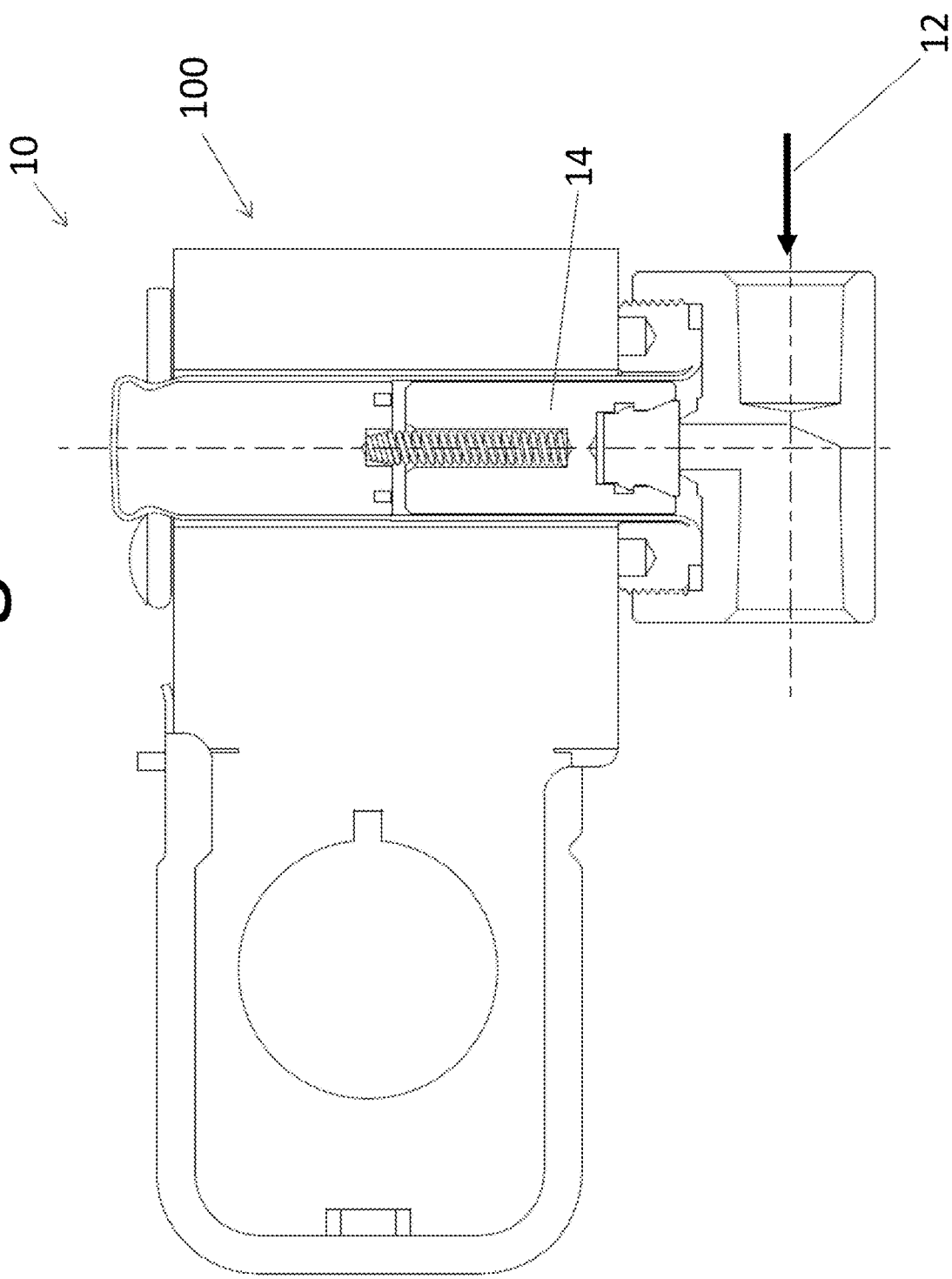

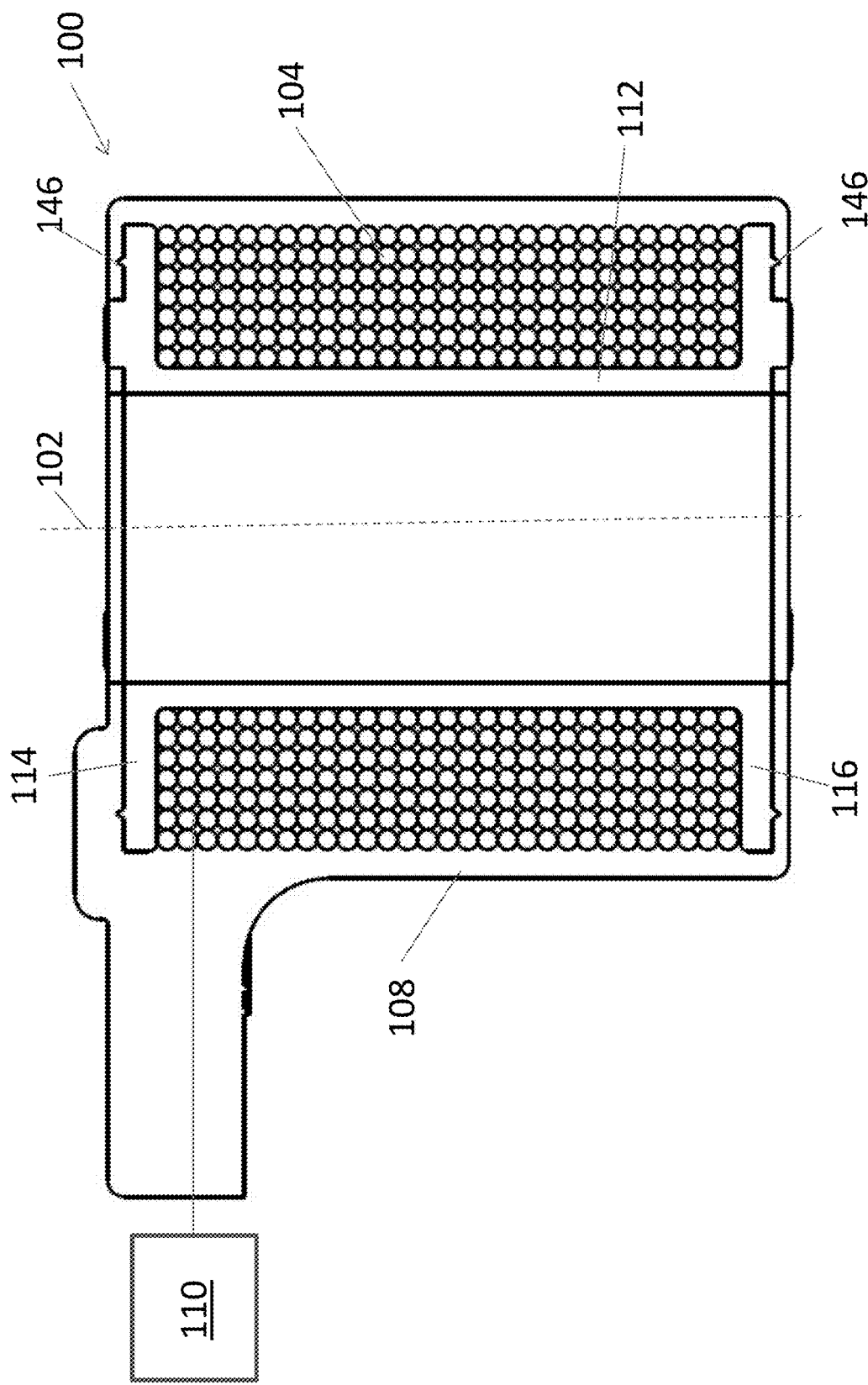

SOLENOID COIL INCLUDING BOBBIN WITH MOISTURE BARRIER

FIELD

The field of the disclosure relates generally to solenoid coils for solenoid valves, and more particularly, to solenoid coils including bobbins.

BACKGROUND

Solenoid valves are used to control fluid flow through systems that transport fluid, such as for example in air conditioning and refrigeration systems. Solenoid valves typically include a coil winding positioned on a bobbin to form a solenoid coil. The solenoid coil is connected to a power source that provides power to the coil winding. The valves are sometimes exposed to moisture that can cause the coil winding to short or fail. A solenoid coil that is resistant to moisture-induced failure but still cost-effective is needed.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a solenoid coil for a solenoid valve of a fluid transport system includes a coil winding that generates an electromagnetic force when a current is supplied to the coil winding. The solenoid coil also includes an electrically insulative bobbin made of an insulating material having a melting point. The bobbin includes a spool for supporting the coil winding. The spool includes a first end and a second end opposite the first end. The coil winding is positioned between the first end and the second end. The bobbin also includes a flange connected to one of the first end and the second end. The flange has an outer edge. Studs extend from the flange. Also, a continuous ridge extends from the flange between the outer edge and the studs to form a moisture barrier. The solenoid coil further includes an overmold enclosing at least a portion of the bobbin and the coil winding. The overmold includes the same insulating material as the bobbin and has the same melting point. The overmold bonds to the continuous ridge when the solenoid coil is heated to a temperature above the melting point.

In another aspect, a bobbin includes a spool for supporting a coil winding. The spool includes a first end and a second end opposite the first end. The coil winding is positioned between the first end and the second end. A flange is connected to one of the first end and the second end. The flange has an outer edge. Studs extend from the flange along an arc spaced a first distance from the outer edge. A continuous ridge extends from the flange to form a moisture barrier between the outer edge and the studs. The continuous ridge is spaced a second distance from the outer edge that is less than the first distance. A ratio of the first distance to the second distance is in a range from about 4:1 to about 4:3. The continuous ridge is configured to bond to an overmold that encloses at least a portion of the bobbin.

In yet another aspect, an electrically insulative bobbin includes a spool for supporting a coil winding. The spool includes a first end and a second end opposite the first end. The coil winding is positioned between the first end and the second end. The bobbin also includes a flange connected to one of the first end and the second end. The flange includes an inner surface facing the coil winding and an outer surface facing away from the coil winding. The flange has a thickness defined between the inner surface and the outer surface. The bobbin further includes studs extending from the outer surface. The bobbin also includes a continuous ridge extending from the outer surface to form a moisture barrier. The continuous ridge has a triangular shape in cross-section with a peak and forming an angle at the peak in a range from about 45° to about 90°. A ratio of the thickness of the flange to a height of the continuous ridge is in a range from about 25:4 to about 3:1. The peak is adapted to fuse with an overmold that encloses at least a portion of the bobbin.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

FIG. 1 is a plan view of a solenoid valve.

FIG. 1A is a schematic view of a solenoid coil of the solenoid valve shown in FIG. 1.

Corresponding reference characters indicate corresponding parts throughout the several views of the drawings.

DETAILED DESCRIPTION

Figure 2:
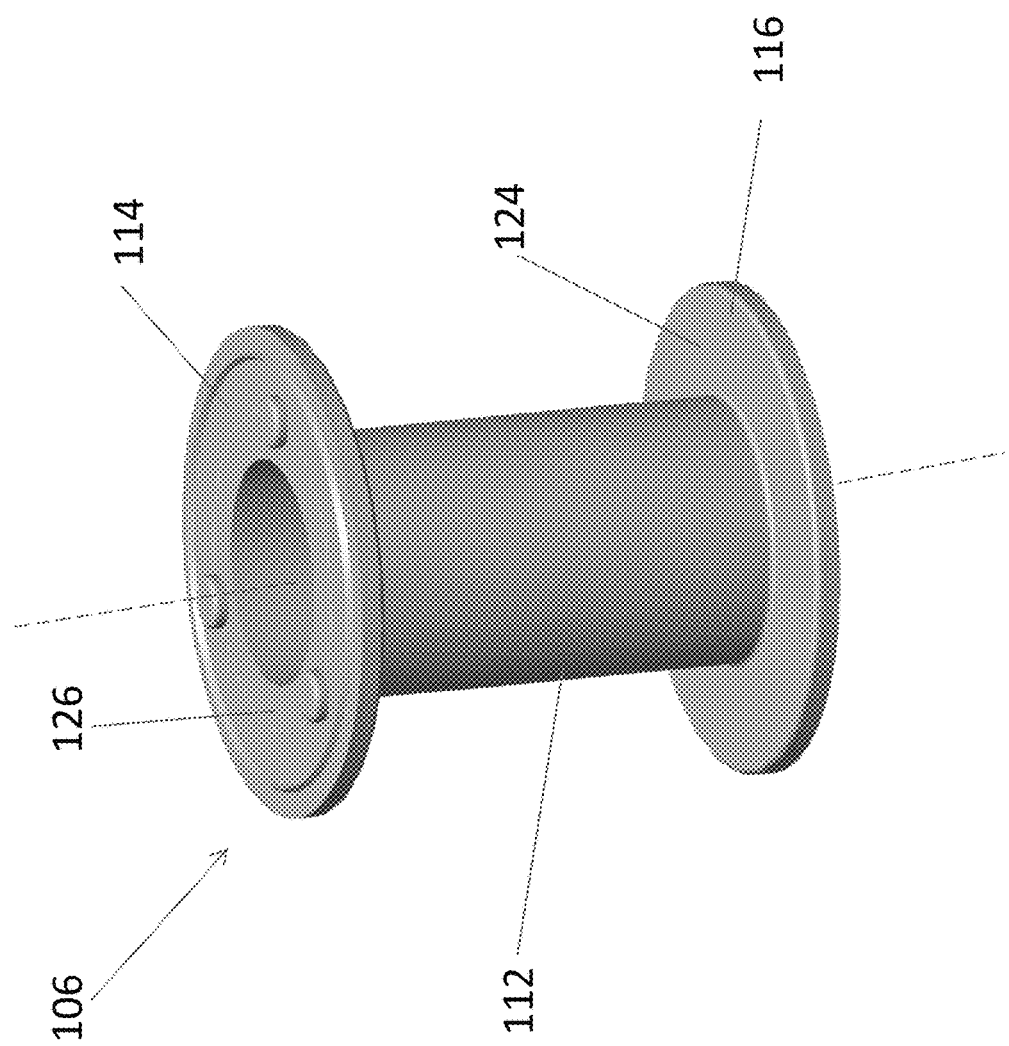
FIG. 2 is a perspective view of a bobbin of the solenoid coil shown in FIG. 1A.

Referring to FIG. 1, a solenoid valve is shown and is indicated generally at 10. Solenoid valve 10 generally includes a solenoid coil 100 and a valve closure 14. Valve closure 14 is movable to allow solenoid valve 10 to regulate fluid flow 12 through a portion of a fluid transport system. In particular, valve closure 14 moves within solenoid valve 10 between an open position where fluid flow 12 is allowed through solenoid valve 10 and a closed position where fluid flow 12 is inhibited through solenoid valve 10. In other embodiments, solenoid valve 10 has any configuration that enables solenoid valve 10 to operate as described.

FIG. 1A is a schematic view of solenoid coil 100 of solenoid valve 10. Throughout this description, references to axial directions refer to directions parallel to an axis 102 extending through solenoid coil 100. References to radial directions refer to directions perpendicular to axis 102. Solenoid coil 100 includes a coil winding 104, a bobbin 106, and an overmold 108. Coil winding 104 is supported by bobbin 106 and generates an electromagnetic force when current is supplied to coil winding 104. The electromagnetic force generated by coil winding 104 is used to regulate fluid flow 12 through a fluid transport system. For example, in some embodiments, the electromagnetic force acts on a valve closure 12 to move valve closure 12 between the open and closed positions to regulate fluid flow. A controller 110 is connected to coil winding 104 and controls the current supplied to coil winding 104. In other embodiments, solenoid coil 100 may have any configuration that enables solenoid coil 100 to operate as described.

Overmold 108 encloses coil winding 104 and bobbin 106 to protect coil winding 104 from the ambient environment. Among other functions, overmold 108 protects coil winding 104 from liquid that may collect on solenoid coil 100 during operation of solenoid coil 100. For example, liquid may condense on flanges 114, 116 when solenoid coil 100 operates at a temperature below the temperature of the surrounding environment. Overmold 108 inhibits the liquid contacting and causing deterioration of coil winding 104.

In reference to FIG. 2, bobbin 106 includes a spool 112, a first flange 114, and a second flange 116. In some embodiments, spool 112 may have any shape that enables spool 112 to function as described. In the illustrated embodiment, spool 112 forms a hollow cylinder. Spool 112 has a first end 120 and a second end 122 opposite first end 120. First flange 114 is connected to and extends radially outward from first end 120. Second flange 116 is connected to and extends radially outward from second end 122. Accordingly, first flange 114 and second flange 116 are spaced axially from each other. The space between first flange 114 and second flange 116 is sized and shaped to receive coil winding 104. In alternative embodiments, bobbin 106 has any configuration that enables solenoid coil 100 to operate as described.

Bobbin 106 may be made of any materials that enable solenoid coil 100 to operate as described. In this embodiment, bobbin 106 is made of an electrically insulative material. For example, electrically insulative materials include, without limitation, plastic, rubber, and combinations thereof. In this embodiment, bobbin 106 is formed as a single piece. In other embodiments, bobbin 106 may be formed in any manner that enables bobbin 106 to function as described. For example, in some embodiments, first flange 114, second flange 116, and spool 112 are formed separately.

In reference to FIG. 1, coil winding 104 is positioned on bobbin 106. More specifically, coil winding 104 is wrapped circumferentially around spool 112 between ends 120, 122. Coil winding 104 may be any electrically conductive material. For example, in some embodiments, coil winding 104 is a metallic wire. In operation, current from controller 110 is conducted through coil winding 104 and coil winding 104 generates an electromagnetic force as current flows through coil winding 104. In alternative embodiments, coil winding 104 has any configuration that enables solenoid coil 100 to operate as described.

Figure 3:
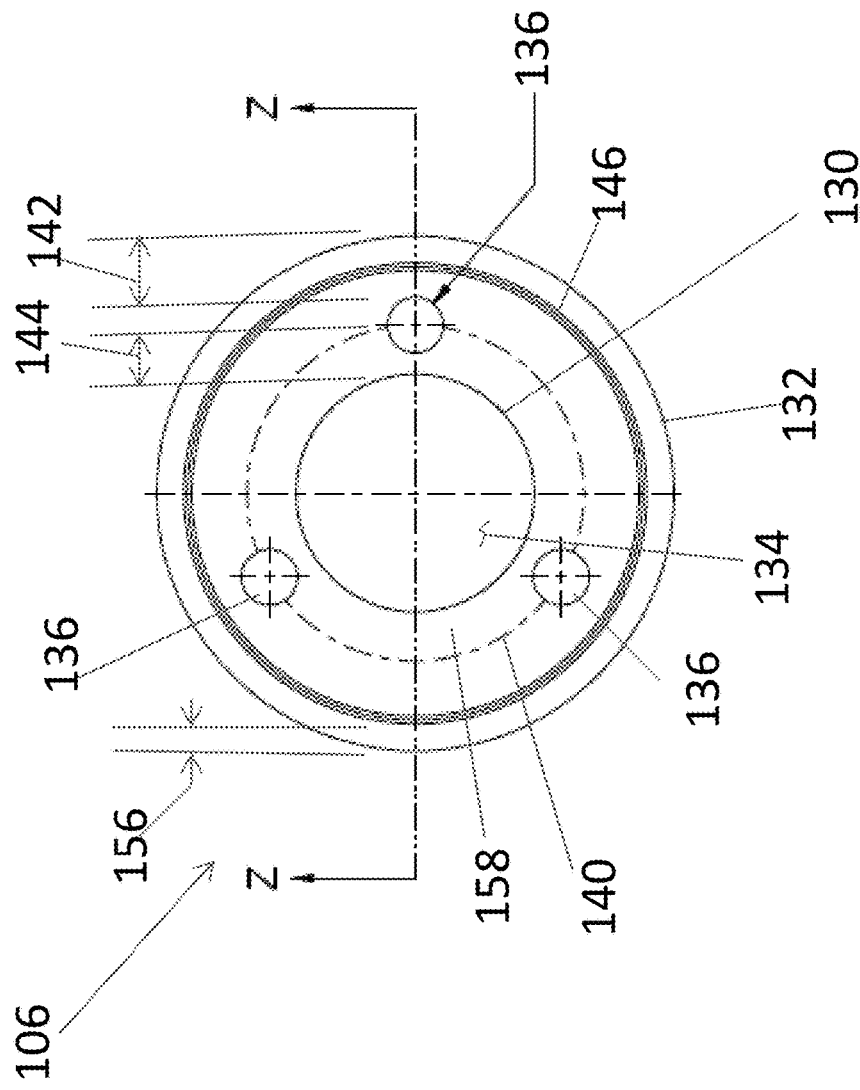
FIG. 3 is a plan view of the bobbin shown in FIG. 2.
Figure 4:
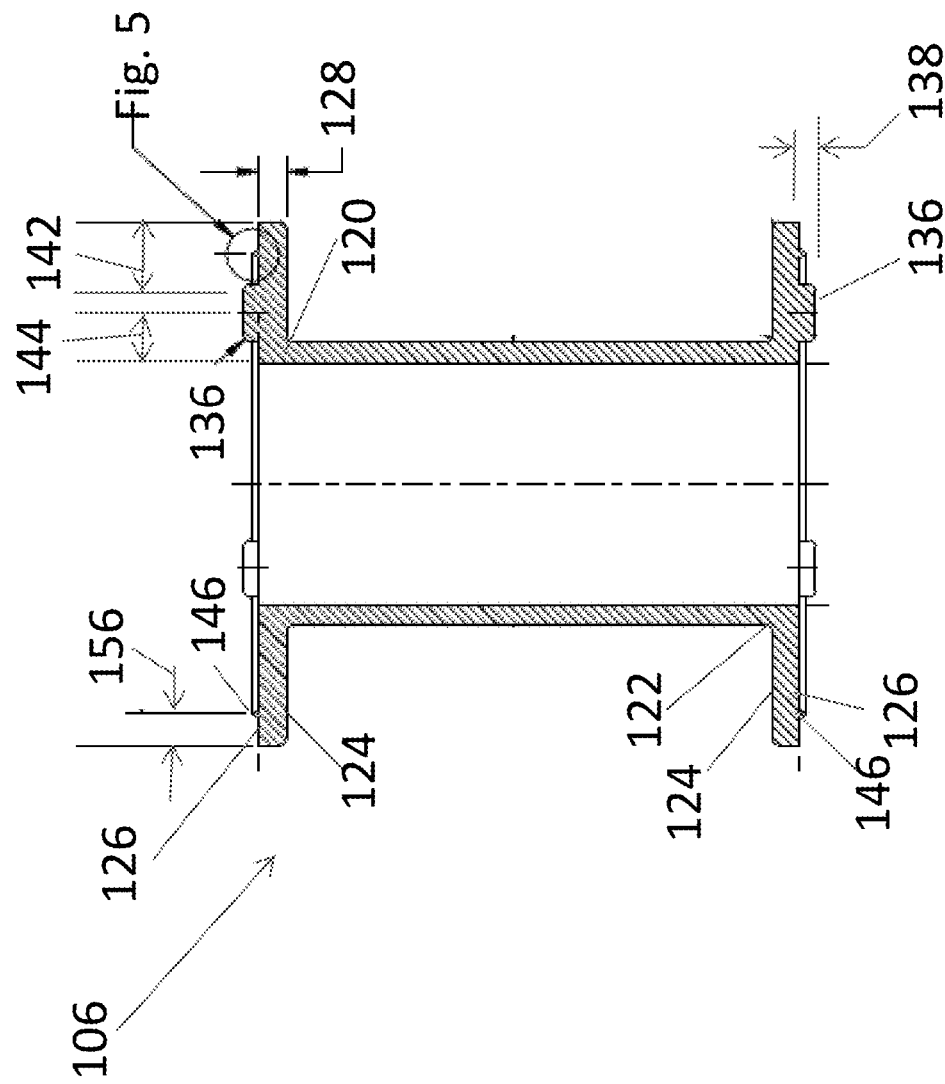
FIG. 4 is a cross-section of the bobbin shown in FIG. 2 taken along section line 2-2.

In reference to FIGS. 2-4, each flange 114, 116 includes an inner surface 124 facing coil winding 104 (shown in FIG. 1A) and an outer surface 126 facing away from coil winding 104. A thickness 128 of each flange 114, 116 is defined between inner surface 124 and outer surface 126. In this embodiment, thickness 128 of first flange 114 is equal to thickness 128 of second flange 116. In alternative embodiments, flanges 114, 116 may have any thicknesses 128 that enable solenoid coil 100 to operate as described.

In this embodiment, flanges 114, 116 have an annular shape. More specifically, each flange 114, 116 includes an inner edge 130 defining an inner opening 134 and an outer edge 132 spaced radially outward from inner edge 130. Inner edge 130 and outer edge 132 extend between inner surface 124 and outer surface 126. Each flange 114, 116 is connected to spool 112 adjacent inner edge 130 such that each inner opening 134 aligns with the hollow interior of spool 112. In alternative embodiments, flanges 114, 116 may have any shapes that enable bobbin 106 to function as described.

In reference to FIG. 4, bobbin 106 includes ejector studs 136 extending from each flange 114, 116. More specifically, ejector studs 136 extend a height 138 above outer surfaces 126 of flanges 114, 116. In some embodiments, ejector studs 136 space flanges 114, 116 from a mold (not shown) to allow material forming overmold 108 to flow around bobbin 106. Ejector studs 136 allow solenoid coil 100 to be ejected from the mold after overmold 108 is formed. In the illustrated embodiment, bobbin 106 includes three cylindrical ejector studs 136 extending from each flange 114, 116. In other embodiments, bobbin 106 may include any ejector studs 136 that enable bobbin 106 to function as described.

In reference to FIG. 3, ejector studs 136 are aligned along an arc 140 on each flange 114, 116. In this embodiment, arc 140 forms a circle that is concentric with outer edge 132 and inner edge 130. Arc 140 is spaced radially outward from inner edge 130 a distance 144. Ejector studs 136 are spaced evenly along arc 140 such that ejector studs 136 are approximately 120° apart. In alternative embodiments, ejector studs 136 may be positioned in any manner that enables bobbin 106 to function as described.

In reference to FIGS. 2-5, a continuous ridge 146 also extends from each flange 114, 116. More specifically, continuous ridge 146 extends from outer surface 126 of each flange 114, 116. In the illustrated embodiment, continuous ridge 146 has a triangular shape in cross-section. In alternative embodiments, continuous ridge 146 has any shape that enables bobbin 106 to function as described.

Figure 5:
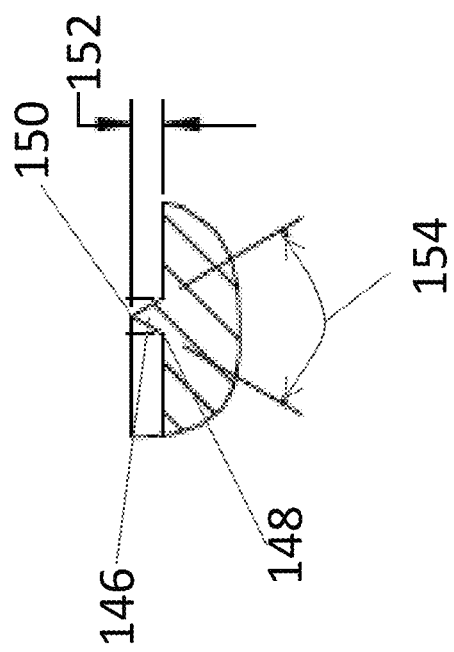
FIG. 5 is an enlarged cross-section view of a continuous ridge of the bobbin shown in FIG. 4.

In reference to FIG. 5, continuous ridge 146 includes a base 148 and a peak 150. A height 152 of continuous ridge 146 is measured from outer surface 126 to peak 150. Height 152 inhibits liquid on outer surface 126 flowing over continuous ridge 146 because height 152 is substantially greater than the depth of the liquid. In addition, height 152 enables continuous ridge 146 to heat to a melting point quicker than other portions of flanges 114, 116. As a result, continuous ridge 146 melts and bonds with overmold 108 before other portions of flanges 114, 116. In some embodiments, height 152 is proportional to thickness 128 of at least one of flanges 114, 116. In some embodiments, a ratio of thickness 128 to height 152 of continuous ridge 146 is in a range from about 6:1 to about 3:1. In this embodiment, the ratio of thickness 128 to height 152 is approximately 4:1. In alternative embodiments, continuous ridge 146 has any height 152 that enables bobbin 106 to function as described.

In this embodiment, continuous ridge 146 forms an angle 154 at peak 150. Angle 154 and the triangular shape of continuous ridge 146 affect the temperature distribution through continuous ridge 146. In particular, angle 154 provides a thin point at peak 150 where continuous ridge 146 changes temperature at the quickest rate. As a result, peak 150 heats to a melting point quicker than other portions of bobbin 106 such that peak 150 acts as a flash point to fuse with overmold 108. In some embodiments, angle 154 is in a range from about 45° to about 90°. In this embodiment, angle 154 is approximately 60°. Moreover, in the illustrated embodiment, continuous ridge 146 forms an equilateral triangle in cross-section. As used throughout this description, equilateral triangle means a triangle including three equal angles. In alternative embodiments, continuous ridge 146 forms any angles that enable bobbin 106 to function as described.

In reference to FIGS. 3-4, continuous ridge 146 forms a circle on outer surface 126. In particular, continuous ridge 146 is concentric with and spaced radially inward from outer edge 132. Moreover, continuous ridge 146 extends between outer edge 132 and ejector studs 136. A distance 156 between continuous ridge 146 and outer edge 132 is less than a distance 142 between ejector studs 136 and outer edge 132. In some embodiments, a ratio of distance 142 to distance 156 is in a range from about 4:1 to about 4:3. In this embodiment, a ratio of distance 142 to distance 156 is approximately 2:1. In other words, continuous ridge 146 is positioned approximately midway between outer edge 132 and arc 140. Continuous ridge 146 is positioned on flanges 114, 116 to provide support between outer edge 132 and arc 140. The structural support provided by continuous ridge 146 reduces waviness of flanges 114, 116 such that overmold 108 uniformly covers flanges 114, 116. In particular, continuous ridge 146 reduces waviness adjacent outer edge 132 which is the portion of flanges 114, 116 that is spaced the greatest distance from spool 112 and has the least resistance to waviness.

Moreover, continuous ridge 146 forms a moisture barrier that directs liquid on flanges 114, 116 away from outer edge 132 of each flange 114, 116. An inner area 158 of each flange 114, 116 is circumscribed by continuous ridge 146 and is substantially free of moisture barriers that inhibit the flow of moisture across inner area 158. As a result, liquid can flow away from continuous ridge 146 and across inner area 158 towards inner opening 134. In addition, inner area 158 allows the liquid to flow away from ejector studs 136 and inhibits the liquid collecting around ejector studs 136.

In reference to FIGS. 1-3, overmold 108 extends at least partially on each flange 114, 116 and bonds to continuous ridge 146. As a result, overmold 108 and continuous ridge 146 inhibit liquid flowing between overmold 108 and bobbin 106. In particular, the bond of continuous ridge 146 and overmold 108 substantially seals a gap between overmold 108 and bobbin 106 to inhibit liquid wicking between overmold 108 and bobbin 106. In alternative embodiments, overmold 108 has any configuration that enables solenoid coil 100 to operate as described.

In some embodiments, overmold 108 may be made of materials having the same melting point as bobbin 106 to facilitate overmold 108 and at least a portion of bobbin 106 bonding when overmold 108 and bobbin 106 are heated to a temperature above the melting point. For example, in this embodiment, overmold 108 is formed from the same insulating material as bobbin 106. In alternative embodiments, overmold 108 is made of any materials that enable solenoid coil 100 to operate as described.

Figure 6:
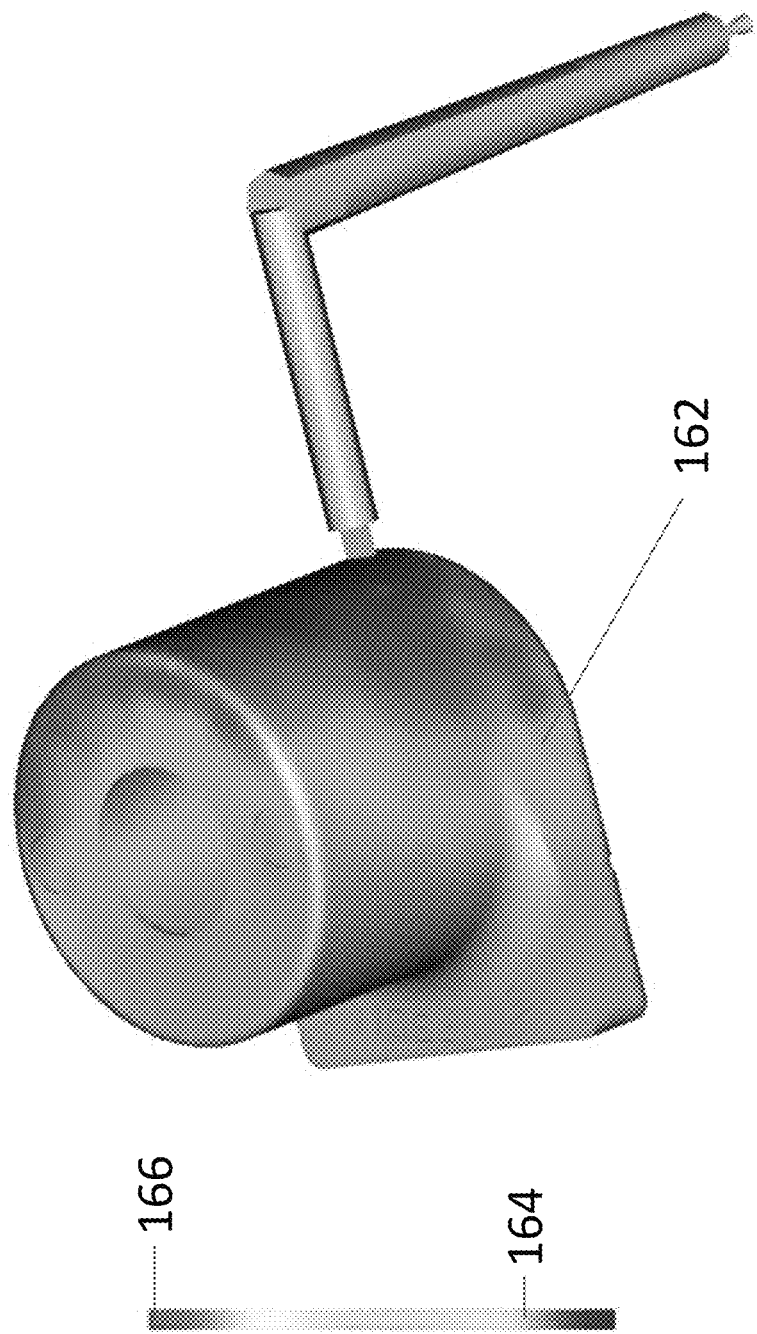
FIG. 6 is an illustration of a temperature gradient of molten material forming an overmold.

In reference to FIGS. 1, 4, and 6, in some embodiments, overmold 108 may be formed from a molten material 162 using a mold (not shown). Coil winding 104 and bobbin 106 are positioned in the mold and ejector studs 136 form a space for molten material 162 between bobbin 106 and the mold. Molten material 162 is heated above a melting point and injected into the mold. Within the mold, molten material 162 is directed to flow over coil winding 104 and bobbin 106. As molten material 162 flows over bobbin 106, portions of bobbin 106, such as continuous ridge 146, portions of flanges 114, 116, and portions of ejector studs 136, at least partially melt and fuse with molten material 162. In particular, continuous ridge 146 at least partially melts and fuses with molten material 162 to form a continuous seal between bobbin 106 and overmold 108. The shape and size of continuous ridge 146 allow continuous ridge 146 to bond or fuse with the overmold 108. For example, peak 150 acts as a flash point for continuous ridge 146 to fuse with overmold 108. In addition, base 148 inhibits continuous ridge 146 being disconnected from flanges 114, 116 when molten material 162 flows along outer surface 126. After molten material 162 flows over and bonds with at least a portion of bobbin 106, molten material 162 is cooled to form overmold 108.

FIG. 6 illustrates a temperature gradient of molten material 162 forming overmold 108. Molten material 162 ranges in temperature from a lower temperature 164 to a higher temperature 166. Suitably, both lower temperature 164 and higher temperature 166 are above the melting points of molten material 162 and bobbin 106. Molten material 162 is supplied by an inlet and flows over coil winding 104 (shown in FIG. 1A) and bobbin 106 (shown in FIG. 1A). As molten material 162 flows over coil winding 104 (shown in FIG. 1A) and bobbin 106 (shown in FIG. 1A), the temperature of molten material 162 decreases from higher temperature 166 to lower temperature 164. The decrease in temperature of molten material 162 is due at least in part to coil winding 104 (shown in FIG. 1A) and bobbin 106 (shown in FIG. 1A) absorbing heat from molten material 162. In particular, portions of bobbin 106, such as ejector studs 136 (shown in FIG. 2), act as heat sinks for heat from molten material 162. In contrast, continuous ridge 146 (shown in FIG. 2) acts as a flash point which at least partially melts without removing a significant amount of heat from molten material 162. As a result, continuous ridge 146 has substantially the same temperature as molten material 162, which allows continuous ridge 146 to quickly and uniformly fuse with molten material 162. When molten material 162 cools to form overmold 108, continuous ridge 146 (shown in FIG. 2) and overmold 108 (shown in FIG. 1A) are bonded and inhibit moisture intrusion between overmold 108 (shown in FIG. 1A) and bobbin 106 (shown in FIG. 1A).

Embodiments of the systems described achieve superior results as compared to prior art systems. For example, the solenoid valves described include a continuous ridge forming a moisture barrier to inhibit liquid contacting the coil winding of the solenoid coil. In addition, the continuous ridge bonds to an overmold to seal the overmold and inhibit moisture penetration between the overmold and a bobbin. Moreover, the continuous ridge provides structural support to a flange to reduce waviness of the flange and increase the uniformity of the thickness of the overmold.

Example embodiments of solenoid valves for use in fluid transport systems are described above in detail. The system and valves are not limited to the specific embodiments described, but rather, components of the system and valves may be used independently and separately from other components described. For example, the solenoid valves described may be used in any fluid transport systems including, without limitation, refrigeration systems, pumping systems, air conditioning systems, and fluid application systems.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing(s) shall be interpreted as illustrative and not in a limiting sense.

What is claimed is:

1. A solenoid coil for a solenoid valve of a fluid transport system, the solenoid coil comprising:
   a coil winding that generates an electromagnetic force when a current is supplied to the coil winding;
   an electrically insulative bobbin made of an insulating material having a melting point, the bobbin comprising:
      a spool for supporting the coil winding, the spool including a first end and a second end opposite the first end, the coil winding positioned between the first end and the second end;
      a flange connected to one of the first end and the second end, the flange having an outer edge;
      studs extending from the flange along a stud arc spaced a first distance from the outer edge; and
      a continuous ridge extending from the flange between the outer edge and the studs to form a moisture barrier, wherein the continuous ridge surrounds the studs and the stud arc, the continuous ridge being spaced a second distance from the outer edge that is less than the first distance, a ratio of the first distance to the second distance being in a range from about 4:1 to about 4:3 to reduce waviness in the outer edge of the flange; and
   an overmold enclosing at least a portion of the bobbin and the coil winding, the overmold including the same insulating material as the bobbin and having the same melting point, the overmold bonding to the continuous ridge when the solenoid coil is heated to a temperature above the melting point.

2. The solenoid coil of claim 1, wherein the continuous ridge is positioned approximately midway between the stud arc and the outer edge.

3. The solenoid coil of claim 1, wherein the flange has a thickness, the continuous ridge including a base adjacent the flange and a peak spaced a height from the flange, a ratio of the thickness of the flange to a height of the continuous ridge being in a range from about 25:4 to about 3:1, the peak bonding to the overmold.

4. The solenoid coil of claim 3, wherein the continuous ridge has a triangular shape in cross-section and forms an angle in a range from about 45° to about 90°.

5. The solenoid coil of claim 1, wherein the spool, the flange, the studs, and the continuous ridge are formed as a single piece.

6. The solenoid coil of claim 1, wherein the spool is a cylinder and the flange includes an inner edge connected to an end of the spool, and the flange extends radially outward from the inner edge, the continuous ridge being concentric with the inner edge.

7. The solenoid coil of claim 6, wherein the inner edge defines an inner opening and the continuous ridge circumscribes an inner area around the inner edge, the inner area being free of moisture barriers.

8. A bobbin comprising:
   a spool for supporting a coil winding, the spool including a first end and a second end opposite the first end, the coil winding being positioned between the first end and the second end;
   a flange connected to one of the first end and the second end, the flange having an outer edge;
   studs extending from the flange along an arc spaced a first distance from the outer edge; and
   a continuous ridge extending from the flange to form a moisture barrier between the outer edge and the studs, wherein the continuous ridge surrounds the studs and the arc, the continuous ridge being spaced a second distance from the outer edge that is less than the first distance, a ratio of the first distance to the second distance being in a range from about 4:1 to about 4:3 to reduce waviness in the outer edge of the flange, the continuous ridge being configured to bond to an overmold that encloses at least a portion of the bobbin.

9. The bobbin of claim 8, wherein the continuous ridge is positioned approximately midway between the arc and the outer edge.

10. The bobbin of claim 8, wherein the flange defines an inner opening and the continuous ridge circumscribes an inner area around the inner opening, the inner area being free of moisture barriers to allow liquid to flow towards the inner opening.

11. The bobbin of claim 8, wherein the flange has a thickness, the continuous ridge including a base adjacent the flange and a peak spaced a height from the flange, a ratio of the thickness of the flange to a height of the continuous ridge being in a range from about 25:4 to about 3:1, the peak bonding to the overmold.

12. The bobbin of claim 11, wherein the continuous ridge has a triangular shape in cross-section and forms an angle in a range from about 45° to about 90°.

13. The bobbin of claim 8, wherein the spool, the flange, the studs, and the continuous ridge are formed as a single piece from a material having a melting point similar to a melting point of the overmold.

14. The bobbin of claim 8, wherein an outer edge of the flange is circular, the continuous ridge forming a circle concentric with the outer edge.

15. An electrically insulative bobbin comprising:
   a spool for supporting a coil winding, the spool including a first end and a second end opposite the first end, the coil winding being positioned between the first end and the second end;
   a flange connected to one of the first end and the second end and defining an inner opening, the flange including an inner surface facing the coil winding and an outer surface facing away from the coil winding, the flange having a thickness defined between the inner surface and the outer surface;
   studs extending from the outer surface; and
   a continuous ridge extending from the outer surface to form a moisture barrier, wherein the continuous ridge surrounds the studs and circumscribes an inner area around the inner opening, the inner area being free of moisture barriers to allow liquid to flow from the studs towards the inner opening, the continuous ridge having a triangular shape in cross-section with a peak and forming an angle at the peak in a range from about 45° to about 90°, a ratio of the thickness of the flange to a height of the continuous ridge being in a range from about 25:4 to about 3:1, the peak adapted to fuse with an overmold that encloses at least a portion of the bobbin.

16. The bobbin of claim 15, wherein the studs are aligned along an arc spaced a first distance from an outer edge of the flange, the continuous ridge being spaced a second distance from the outer edge that is less than the first distance, a ratio of the first distance to the second distance being in a range of from about 4:1 to about 4:3.

17. The bobbin of claim 15, wherein the ratio of the thickness to the height is approximately 4:1.

18. The bobbin of claim 15, wherein the angle is approximately 60°.

19. The bobbin of claim 18, wherein the triangular cross-section shape of the continuous ridge includes three equal angles.

20. The bobbin of claim 15, wherein the spool, the flange, the studs, and the continuous ridge are formed as a single piece from a material having a melting point similar to a melting point of the overmold.

* * * * *